(12) United States Patent
Topalli et al.

(10) Patent No.: US 11,689,775 B2
(45) Date of Patent: Jun. 27, 2023

(54) SYSTEM AND METHOD OF SETTING SELECTION FOR THE PRESENTATION OF AV CONTENT

(71) Applicant: SONY GROUP CORPORATION, Tokyo (JP)

(72) Inventors: Ayca Topalli, Basingstoke (GB); Ryan Ling, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/423,554

(22) PCT Filed: Jan. 28, 2020

(86) PCT No.: PCT/GB2020/050183
§ 371 (c)(1),
(2) Date: Jul. 16, 2021

(87) PCT Pub. No.: WO2020/157475
PCT Pub. Date: Aug. 6, 2020

(65) Prior Publication Data
US 2022/0124416 A1 Apr. 21, 2022

(30) Foreign Application Priority Data
Jan. 31, 2019 (GB) .................... 1901324

(51) Int. Cl.
*H04N 21/485* (2011.01)
*H04N 21/8405* (2011.01)
*H04N 21/44* (2011.01)

(52) U.S. Cl.
CPC ..... *H04N 21/4852* (2013.01); *H04N 21/4854* (2013.01); *H04N 21/4858* (2013.01); *H04N 21/8405* (2013.01); *H04N 21/44008* (2013.01)

(58) Field of Classification Search
CPC ........... H04N 21/4852; H04N 21/4854; H04N 21/4858; H04N 21/8405; H04N 21/44008
See application file for complete search history.

(56) References Cited

U.S. PATENT DOCUMENTS

2002/0067436 A1   6/2002  Shirahama et al.
2003/0090479 A1*  5/2003  Tey .................. H04N 21/44008
                                                  348/E5.119
(Continued)

FOREIGN PATENT DOCUMENTS

JP     2002-158941 A     5/2002
JP     2005-300776 A    10/2005
(Continued)

OTHER PUBLICATIONS

International Search Report dated Mar. 16, 2020 in PCT/GB2020/050183 filed on Jan. 28, 2020.

*Primary Examiner* — Pinkal R Chokshi
(74) *Attorney, Agent, or Firm* — Oblon, McClelland, Maier & Neustadt, L.L.P.

(57) ABSTRACT

A method of selecting settings for presenting AV content comprises storing a plurality of settings for presenting AV content, storing a plurality of characteristic features corresponding to AV content, storing a plurality of values defining a strength of association between a respective stored characteristic feature and a respective stored setting, obtaining one or more characteristic features from a currently delivered AV content, determining a cumulative strength of association between respective stored settings and respective stored characteristic features corresponding to the or each characteristic feature obtained from the currently delivered AV content, and selecting the stored setting having the greatest cumulative strength of association.

20 Claims, 4 Drawing Sheets

(56) References Cited

U.S. PATENT DOCUMENTS

| | | | |
|---|---|---|---|
| 2003/0227569 A1* | 12/2003 | Kim | H04N 21/4348 348/E5.122 |
| 2004/0070685 A1* | 4/2004 | Kondo | H04N 21/485 348/553 |
| 2005/0262446 A1 | 11/2005 | Roh | |
| 2006/0212900 A1* | 9/2006 | Ismail | H04N 21/44224 725/35 |
| 2007/0024757 A1 | 2/2007 | Kondo et al. | |
| 2008/0313688 A1 | 12/2008 | Kim et al. | |
| 2009/0052868 A1* | 2/2009 | Furutani | H04N 5/60 386/296 |
| 2011/0164182 A1* | 7/2011 | Wada | H04N 21/4854 348/554 |
| 2011/0176786 A1* | 7/2011 | Cooper | H04N 5/46 386/230 |
| 2012/0090007 A1 | 4/2012 | Xiao et al. | |
| 2012/0206493 A1* | 8/2012 | Koike | H04N 21/431 345/660 |
| 2013/0128119 A1 | 5/2013 | Madathodiyil et al. | |
| 2015/0256891 A1* | 9/2015 | Kim | H04N 21/4854 725/39 |
| 2015/0302819 A1 | 10/2015 | Weksler et al. | |
| 2016/0360145 A1* | 12/2016 | Nie | H04N 21/42202 |
| 2017/0006351 A1* | 1/2017 | Haberman | H04N 21/435 |
| 2017/0264937 A1 | 9/2017 | Jeong et al. | |
| 2018/0203665 A1 | 7/2018 | Lang | |
| 2019/0379832 A1 | 12/2019 | Topalli | |
| 2020/0304882 A1* | 9/2020 | Dos Santos | H04N 21/4532 |
| 2021/0377607 A1* | 12/2021 | Navin | H04N 21/6581 |

FOREIGN PATENT DOCUMENTS

| | | |
|---|---|---|
| WO | WO 2008/057941 A2 | 5/2008 |
| WO | WO 2017/162980 A1 | 9/2017 |

* cited by examiner

SYSTEM AND METHOD OF SETTING SELECTION FOR THE PRESENTATION OF AV CONTENT

The present invention relates to a system and method of setting selection for the presentation of AV content.

Traditionally, TVs have provided the user with the ability to select TV settings for aspects of the picture or audio, such as selecting 'stereo' or 'surround sound', 'voice' or 'music' for audio, and 'dynamic/vivid', 'normal' or 'cinema' for the picture.

In addition, some TVs allow the user to create a custom setting, for example using an equalizer interface for audio, or controls for brightness, contrast, colour temperature and the like for the picture.

Consequently discerning users may wish to create custom TV settings to enhance their experience, and/or select built in settings for the best output. However, not all members of a family may be familiar with such facilities, and so may not be able to obtain the best experience. Similarly users may not wish to select a setting for each programme, even though this may improve their experience, or have to remember to revert from a previous setting to one more suitable for the current content.

The present invention seeks to address or mitigate this problem.

In a first aspect, a method of selecting settings for presenting AV content is provided in accordance with claim 1.

In another aspect, an AV processor is provided in accordance with claim 15.

Further respective aspects and features of the invention are defined in the appended claims.

Embodiments of the present invention will now be described by way of example with reference to the accompanying drawings, in which.

A system and method of setting selection for the presentation of AV content are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
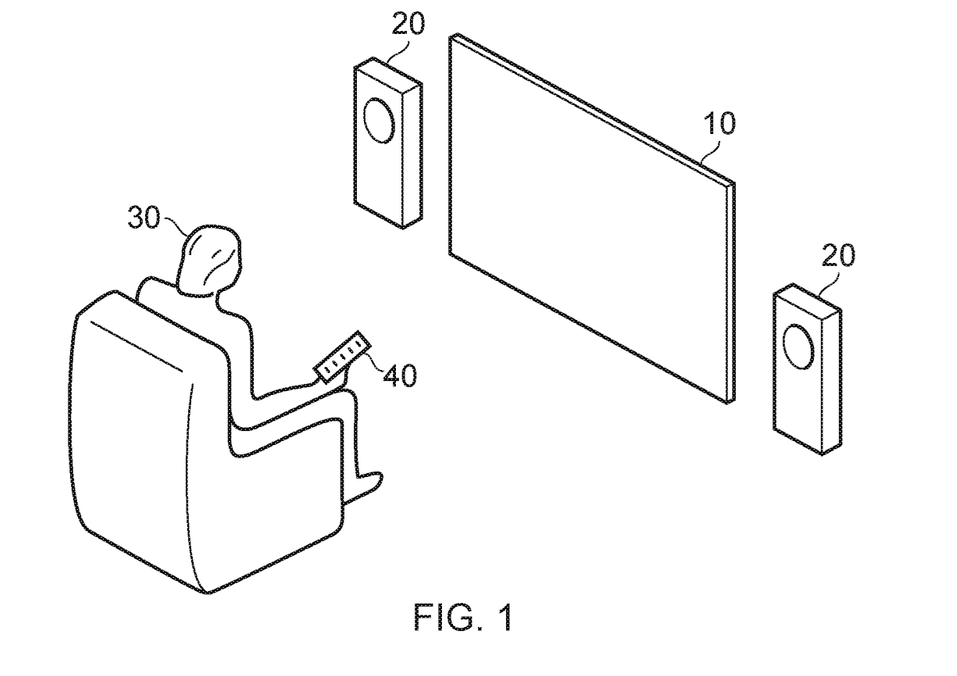
FIG. 1 is a schematic diagram of a typical television viewing environment for a user, in accordance with embodiments of the present invention.

Referring now to the drawings, wherein like reference numerals designate identical or corresponding parts throughout the several views, then in FIG. 1, a user 30 watches a television (or 'TV') 10. The television, or equally a monitor or a laptop, tablet or phone screen, or a head mounted display, acts as a means of outputting audio/video (AV) content.

Meanwhile speakers 20 act as a means of outputting audio content. Typically the audio content is synchronised with the video content and is part of a single audio/video content item, such as a television show or a film (hereafter typically referred to as AV content). The speakers may be integral with the television, or may be separate components.

The user is able to interact with the television via a remote control 40. The remote control may be specific to the TV, or maybe a universal/programmable remote and/or a smart phone app. The interface provided by the remote control may vary according to need; for example either the remote control or the television itself may provide a voice interface; meanwhile an app on a smart phone may provide a virtual keyboard, for example to assist with searching for AV content.

The user is able to interact with a graphical user interface displayed by the TV to select audio and/or picture settings, or to create custom audio and/or picture settings, for example as described previously herein.

Figure 2:
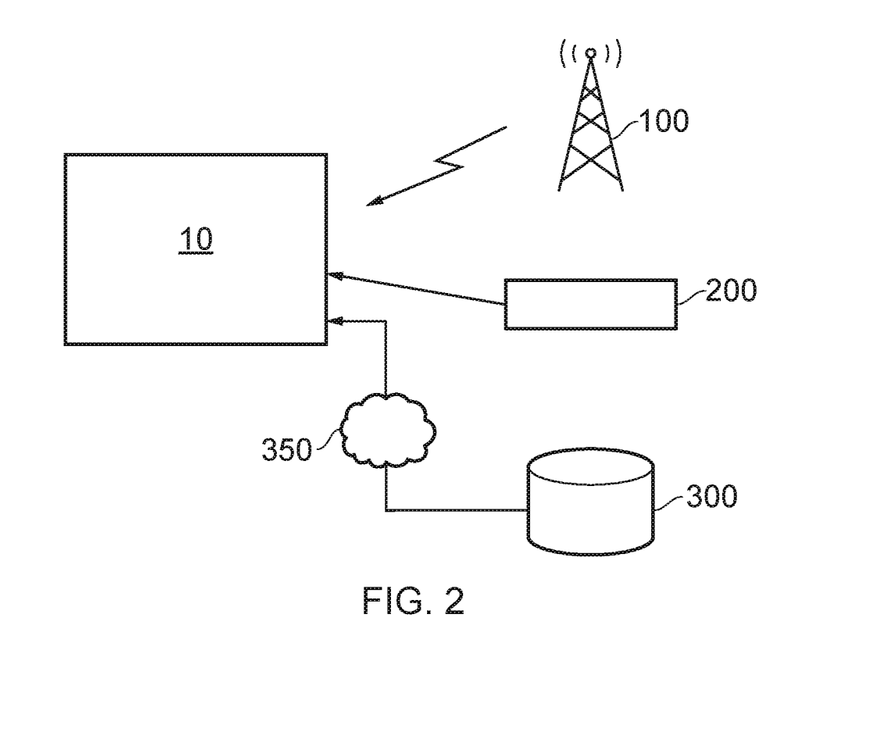
FIG. 2 is a schematic diagram of potential devices in a reception path for a television, in accordance with embodiments of the present invention.

Referring now to FIG. 2, the TV may receive AV content from a number of sources. Analogue or digital AV content may be broadcast from a transmitter 100 and received by an aerial connected to the TV receiver. Similarly AV content (typically digital AV content) may be provided from a set-top box 200. This box may for example be a satellite or cable TV receiver, and/or a videogame console. Similarly, AV content (typically digital AV content) may be provided to the television from a streaming service 300 via the Internet 350 or similar network.

As will be described later herein, in embodiments of the present invention the TV is adapted to select a pre-set or custom setting or settings in response to characteristic features of the received AV content, where the TV has acquired a previous association between the selected setting or settings and characteristic features similar to those of the received AV content.

Hence for example, if a user has previously chosen a 'vivid' picture setting when watching football, then characteristic features of AV content comprising a football match will be given a positive association with the vivid picture setting (for example via weightings between the relevant characteristic features and this setting); subsequently when the currently delivered content comprises similar characteristic features to such a football match, the TV can select the vivid picture setting again, either by applying it automatically or asking the user whether they wish to switch to this setting.

Whilst the above example describes the TV as building the association and making the selection, optionally this may be done by a separate device.

Figure 3:
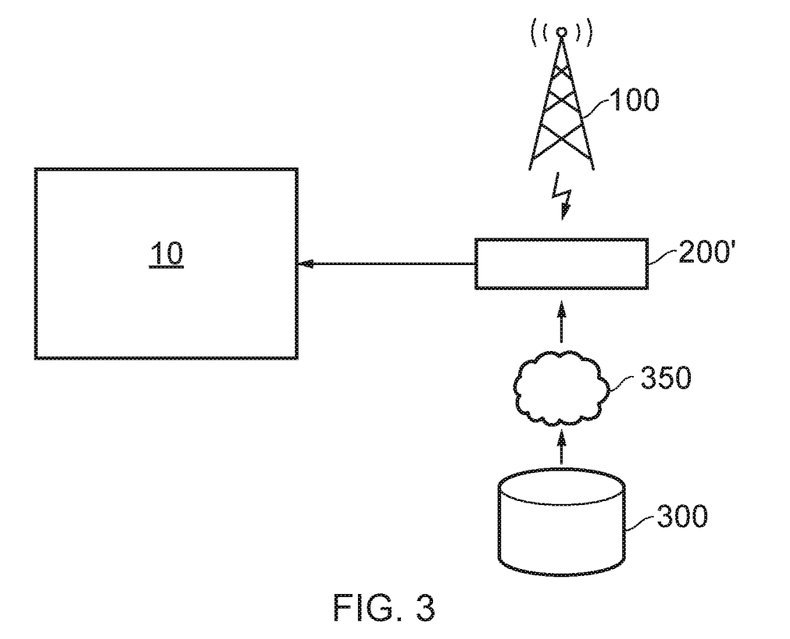
FIG. 3 is a schematic diagram of potential devices in a reception path for a television, in accordance with embodiments of the present invention.

For example referring now to FIG. 3, a set-top box 200' is capable of receiving multiple sources of content, for example broadcast content from a transmitter, satellite or cable content, game content, and/or streamed content from a server via the Internet. The set-top box may then compile associations between AV content and picture and/or audio settings, with the user making their setting selections via a remote control for the set-top box rather than for the TV, and then selecting settings for currently received content as described previously before outputting the result to the TV.

Figure 4:
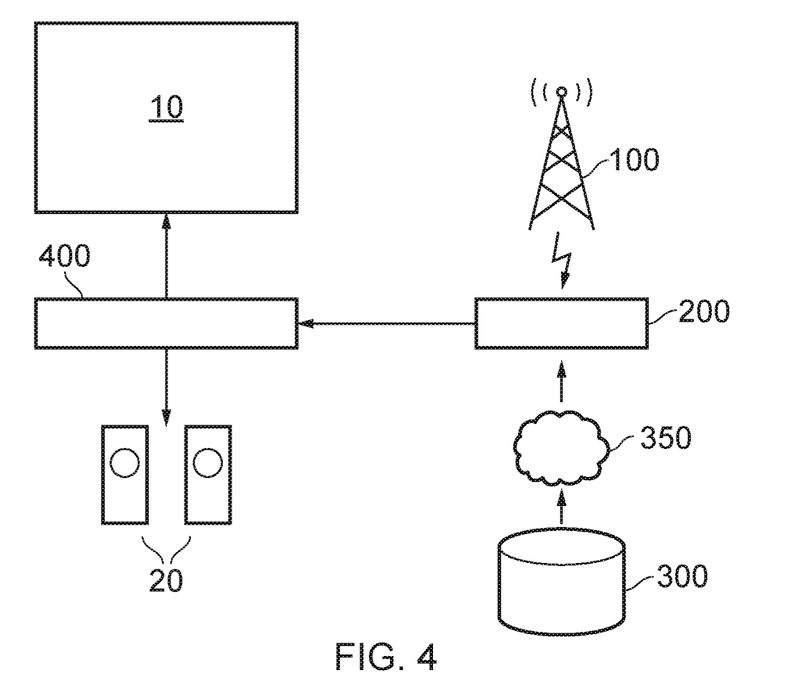
FIG. 4 is a schematic diagram of potential devices in a reception path for a television, in accordance with embodiments of the present invention.

Similarly, referring to FIG. 4, instead, an AV amplifier 400 may fulfil the role of compiling associations between AV content and picture and/or audio settings, and modifying content from a set-top box 200 and/or optionally any other sources that pass through the AV amplifier.

It will also be appreciated that in a similar manner to the set-top box 200' of FIG. 3 or AV amplifier 400 of FIG. 4, the streaming service of FIG. 2 (or indeed of any of the illustrated configurations) may compile associations between AV content and picture and/or audio settings chosen by the user. In this case typically the settings will be relayed back to the streaming service (or server of the streaming service) from the TV or from a network enabled set-top box or AV amplifier, depending on which component of the system is adapted to allow the user to modify picture and/or audio settings and implement the techniques described herein.

It will also be appreciated that optionally instead of modifying the AV content according to the settings themselves, the set-top box 200', the AV amplifier 400, and/or the streaming service 300 may send instructions to the TV in a predefined format indicating which setting or settings the TV itself should select.

As mentioned earlier herein, the selected setting or settings could be built-in pre-sets, or custom settings. As such each pre-set or custom setting typically represents a plurality of individual settings grouped together. However associations may optionally be made with individual settings, either instead of or as well as grouped settings.

Figure 5:
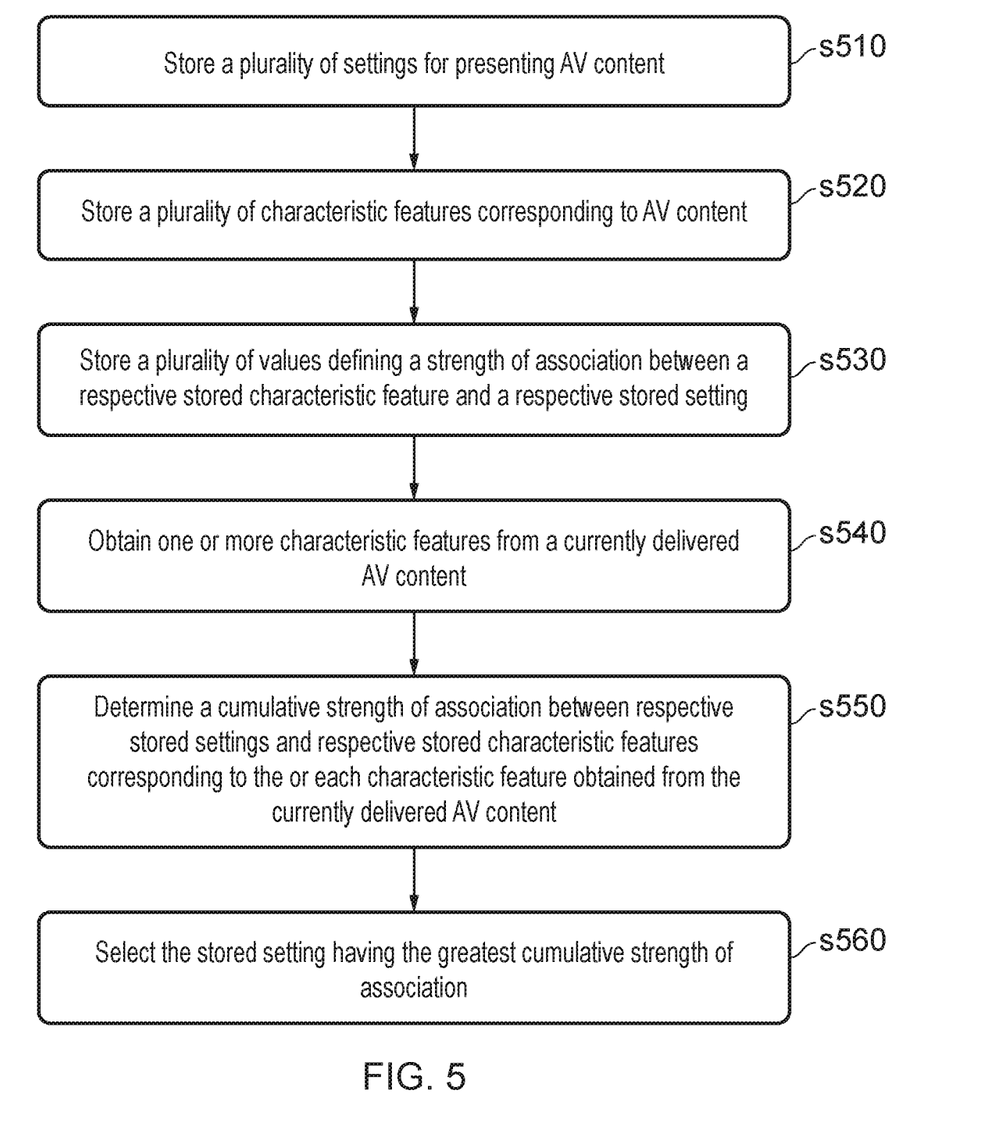
FIG. 5 is a flow diagram of a method of selecting settings for presenting AV content, in accordance with embodiments of the present invention.

Turning now to FIG. 5, a method of selecting a setting for presenting AV content (e.g. by a television) is provided. As will be appreciated from the description herein the settings for presenting AV content may be selected by a television, by an intermediate AV receiver or processor in the content transmission chain (such as an AV amplifier or set-top box), or by a content source such as a streaming service. Furthermore, in principle, settings may be selected by a device that is not in the transmission chain or a source, such as a companion application (for example on a phone) operable to perform steps of the following method and select the settings, whilst not also supplying, forwarding or necessarily displaying the content itself.

In a first step S510, the method comprises storing a plurality of settings for presenting AV content. As described previously herein, these are typically conventional settings for picture and/or audio. Some may be pre-set, and some may be user-defined.

Meanwhile a second step S520 comprises storing a plurality of characteristic features corresponding to AV content. These relate to AV content that has been analysed previously. Optionally, these features are obtained during ongoing use of a specific device, but alternatively or in addition features may be supplied either at manufacture or for example by downloading from a server, for example as part of an update process. Examples of characteristic features are provided in more detail elsewhere herein, but for ease of understanding then typical examples may include the dominant colour of the picture in the content, the aspect ratio of the content, one or more keywords from the content title, one or more keywords from a summary of the content, and the time of delivery (e.g. timing of original transmission, and/or timing of current viewing or streaming).

A third step S530 comprises storing a plurality of values each defining a strength of association between a respective stored characteristic feature and a respective stored setting. Typically this will take the form of weights between each stored characteristic feature and each setting or group of settings selectable by embodiments of the present invention.

As an example, a strong weighting value may exist between a 'Cinema' setting and each of the characteristic features of a widescreen aspect ratio, and the keywords 'film', and 'movie'.

A fourth step S540 comprises obtaining one or more characteristic features from a currently delivered AV content. It will be appreciated that a currently delivered AV content may or may not correspond to a currently received AV content, as not all content is live broadcast or live streamed, but may be recorded or cached for subsequent delivery (or indeed may be pre-recorded for subsequent delivery as in the case of DVD® and Blu-ray® sources).

Again the features may include for example predominant picture colour, aspect ratio and/or descriptive keywords. Other examples are discussed later herein.

A fifth step S550 then comprises determining a cumulative strength of association (e.g. total weighting value) between respective stored settings and respective stored characteristic features corresponding to the or each characteristic feature obtained from the currently delivered AV content.

As is described elsewhere herein, whilst associative weights are typically positive, optionally some or all of the associative weights may be able to take positive or negative values.

Hence if the currently delivered AV content is in a widescreen aspect ratio and associated with the keyword 'film', then among the available settings a 'Cinema' setting may for example have the strongest total weightings between these characteristic features.

However if the currently delivered AV content is in a 16:9 aspect ratio and has a predominantly green picture, then among the available settings a 'Sports' setting may for example have the strongest total weightings between these characteristic features.

By contrast if the currently delivered AV content is in a 16:9 aspect ratio and has a predominantly green picture, but a descriptive keyword for the content is 'garden', which has a negative waiting for the 'Sports' setting, then among the available settings a 'neutral' setting may for example have the largest total weighting between these characteristic features. It will also be appreciated that in this circumstance, the total weighting value may be small as it represents a summation of positive and negative values. Hence, optionally, if the total weighting is below a selection threshold, then no new selection action is made. Alternatively or in addition in these circumstances a notification may be provided to the user.

Finally a sixth step S560 comprises selecting the stored setting having the greatest cumulative strength of association (e.g. the highest total weighting value). Hence in the above examples, 'Cinema', 'Sports' and 'Neutral' would respectively be selected. As noted above however, optionally selection is subject to the cumulative strength of association reaching a predetermined selection threshold.

Selection in this sixth step may either result in automatic use of the setting for the delivered AV content, or in presenting the selected setting to a user for acceptance or refusal before using the setting for the delivered AV content.

It will be appreciated that the cumulative association may be built over time, and also that if desired then optionally the associations could be reset (e.g. to a factory default) by the user, e.g. via a user interface.

Optionally, a user may select whether to allow automatic use of a specific selected setting (or any selected setting), for example once the TV (or other device in the transmission path that is selecting settings according to the present techniques) has learned the user's preferences, by virtue of building a model of these within the associative weights between AV content characteristic features and picture and/or audio settings.

However typically the user will be provided with the option to accept or refuse the proposed setting.

Consequently embodiments of the present invention, the method further comprises the step of presenting the selected stored setting to the user. This is typically done via a graphical user interface of the TV (or voice command), but in principle may be done via a user interface of another device in the transmission path that is selecting settings according to the present techniques, or via a companion app for example on a mobile phone on the same local network as the TV or other device that is selecting settings according to the present techniques.

The method further comprises the step of receiving an indication from the user of whether or not proceed with using the stored setting, for example using an appropriate remote control, by voice command, or by suitable interaction with a companion app.

It will be appreciated that the user's decision may then be used to refine the model of the user's preferences and thus train the TV/relevant device.

Hence if the user indicates to proceed with the selected stored setting, then in embodiments of the present invention the method comprises the step of strengthening the association between respective stored characteristic features corresponding to the or each characteristic feature obtained from the currently received AV content and the selected stored setting.

For example this may be done by incrementing the weights between these features and the relevant setting. It will be appreciated that over the course of multiple viewings, features most common to delivered AV content that is associated with a particular setting will be incremented more often than features less common to delivered AV content that is associated with a particular setting but which nevertheless have a positive correlation with that selection.

Hence one might expect a Gaussian distribution of weight strengths for characteristic features of AV content associated with a given setting, but there is a risk that some weights may significantly outweigh others. Consequently, optionally, weight increments may be asymptotic to a maximum value, or may simply be reduced above a certain threshold value for the weight, or successively reduced for successive thresholds, to limit undue influence by particularly common features. Similarly, some characteristic features may have their maximum weighting capped because it can be anticipated that they are very common. Examples may include the aspect ratio, genre, or channel names, or internet portal names or other classifications of content in an internet portal (e.g. genres or groupings of YouTube® content) corresponding to delivered AV content.

In addition to strengthening characteristic features already stored by the TV/relevant device, if the user indicates to proceed with the selected stored setting, then in embodiments of the present invention the method may comprise the steps of storing one or more characteristic features from the currently received AV content that do not correspond to an existing stored characteristic feature, and creating a positive association between the or each newly stored characteristic feature and the selected stored setting.

Hence for example if keywords associated with the delivered AV content include a new descriptive word, or new program title, then this may be added to the stored characteristic features and given an initial positive weighting so as to contribute to selection of the same setting for next time the delivered AV content or similar is analysed.

Optionally, to limit proliferation of stored characteristic features and to manage memory resources, newly stored characteristic features may be given a probationary status. Under the probationary status, a newly stored characteristic feature may be deleted if it contributes to selection of the same setting again, but this is rejected by the user, or if it does not contribute to the selection of the setting again within a predetermined time period. The probationary status may end once the newly stored characteristic feature receives N additional weight increments indicative of successful contributions to the selection setting, where N may be one or more, and/or once the characteristic feature has been stored for a predetermined period of time.

In the event that memory for characteristic features becomes full, or reaches a threshold occupancy, optionally those stored characteristic features that have the lowest total of absolute weighting values across all settings may be deleted to make space for new stored characteristic features, optionally subject to there being no absolute weighting value above a predetermined number. This latter condition serves to protect features that have a strong but specific correlation between an item of delivered AV content and a setting (such as for example specific program names).

Alternatively or in addition, characteristic features that have not contributed to the selection of a setting for a predetermined period of time may be deleted, and optionally uploaded to a server, for example as account data associated with the particular television or the particular user, for storage. Hence for example where TV show is no longer transmitted, or is no longer recorded by the user, and in due course characteristic features specific to the TV show may be deleted, or moved to longer term storage on the server.

The above features relate to strengthening or adding characteristic features in response to the user accepting the proposed setting for the delivered AV content.

However, if the user indicates not to proceed with a selected stored setting, then in embodiments of the present invention, the method comprises weakening the association between respective stored characteristic features corresponding to the or each characteristic feature obtained from the currently received AV content and the selected stored setting.

It will be appreciated that this then reduces the chance of the setting being offered to the user again.

Optionally, the weakening may be implemented by decrementing the weights in a manner opposite to the increment for positive reinforcement described previously herein. Also in a similar manner the decrement may reflect the linear, asymptotic or threshold based gradation of increment used to build the weight up.

Optionally, the weakening may be calculated to ensure that the selected setting is not selected again, for example by reducing the weights such that the second setting with the second strongest association with the current characteristic features becomes the strongest association.

Clearly this may be of particular relevance in the case where the graphical user interface displays the strongest and second strongest weighted setting for display, allowing the user to decide which to select, if any. In this case, a user selection of the second strongest setting for display may result in positive reinforcement for weights to the second strongest setting and negative reinforcement for weights to the currently strongest setting.

However, a more likely scenario is one of misclassification due to insufficient discrimination between program types. For example, a user may distinguish settings for football and tennis on the one hand, and gardening on the other.

In the case that, based on features such as aspect ratio and dominant picture colour, the system offered a 'Sport' setting for a gardening programme, it may be counter-productive to weaken these links, since they are relevant to detection of a sports programme.

Hence alternatively or in addition, in embodiments of the present invention if the user indicates not to proceed with a selected stored setting, then the method comprises storing one or more characteristic features from the currently received AV content that do not correspond to an existing stored characteristic feature, and creating a negative association between the or each newly stored characteristic feature and the selected stored setting.

In this example, the keyword 'garden' may either not exist in the stored characteristic features, or may not have a positive association with the sports setting (or optionally a positive association below an action threshold). In each of these cases the keyword 'garden' may be considered to not correspond to an existing stored characteristic feature for the purposes of discriminating between gardening programmes and a sports setting.

Consequently in this case, the weighting between the sports setting and the keyword 'garden' may be given a negative waiting calculated to be sufficient to counteract the positive weightings of the existing stored characteristic features contributing to the association, the counteraction being either sufficient to cause a setting with the second strongest association to become the strongest, and/or being sufficient to cause the total weighting between the catalytic features and the sports setting to fall below action threshold.

Using the above techniques of weighting increment in response to user selection, and weighting decrement and/or negative weighting of discriminatory features in response to user rejection, the TV relevant device can build a model of positive and negative associations between characteristic features of delivered AV content and audio and/or video settings. As noted previously these settings can be pre-set or user-defined, and can be grouped and/or individual settings.

It will be appreciated that changes to weights may be made subject to caveats. For example, whilst a user may select a setting, the weights may not be altered until after the user has watched the content with that setting for a predetermined period of time that may be considered indicative of the user's satisfaction with that setting.

It will also be appreciated that the weightings may take the form of an array of P×Q values, where P is the number of stored characteristic features and Q is a number of selectable settings. As new custom settings are created, or as new characteristic features are added, then P and Q may increase, memory resources permitting.

It will also be appreciated that the weightings may take a different form, rather than a one-to-one indicator of associative strength between each characterising feature and each selectable setting as assumed previously herein. For example, the weightings may take the form of a neural network, with characteristic features as inputs, and output nodes corresponding to each selectable setting. The association between the input features and the output node corresponding to the setting desired by the user may then be reinforced, for example, by back-propagation or any other suitable learning technique. More generally, the weightings may therefore take the form of the internal representations of any suitable machine learning technique that can learn associations or correlations between characteristic features and a desired setting selection. In principle, however, the use of one-to-one weights between characteristic features and settings makes the addition or removal of characteristic features and/or settings particularly straightforward.

The characteristic features used by the present techniques may comprise any suitable data or metadata corresponding to AV content.

These features may be considered to fall into four basic classes, discussed in order below:

i. Feature Data Derived from the Content.

Feature data derived from the content may be of particular use, in circumstances where other data such as electronic programme guide data or on-line descriptive data are not available. This may be the case for terrestrial analogue broadcasts and for locally stored AV content such as some DVD® and Blu-Ray® discs, home movies and some home streamed content. It may also be of use if the descriptive data is not sufficiently distinctive, as may be the case for example in some YouTube videos or other digital sources that are not professionally curated.

Examples of feature data derived from the content include picture aspect ratio, dominant colour, image motion, sound level, and in-picture text. Feature data may be derived from objects identified as image segments in the content. This may include items in the background, for example distinctive backdrops logos. Segments may be identified by image analysis using edge detection or identifying colour boundaries.

A letterbox aspect ratio may be indicative of a movie, whilst a 4:3 aspect ratio may be indicative of vintage content. Meanwhile a 16:9 aspect ratio may be may be assumed to be common to the vast majority of content and hence may not be treated as a characteristic feature, or may have its weighting capped.

Dominant colour may be indicative of certain genres of content. Furthermore, dominant colour in certain regions of the image may be indicative of certain genres of content. Hence for example green in the centre of the image is likely to be indicative of a number of sports, whilst a strong red or blue region in a lower portion of the image is indicative of news content.

Image motion may be characteristic of certain genres. For example limited overall movement between cuts may be indicative of certain genres, such as studio based talk shows which use a small number of static cameras.

Sound level may also be indicative of certain genres. In this case 'sound level may comprise features of average volume, dynamic range and spectrum; hence for example a high volume and dominant base may be indicative of either an action movie or a rock concert whereas a low-volume and mid-range spectrum may be indicative of a talk show It will be appreciated that when separate weights for such features are combined as per the techniques described herein, they provide greater discriminatory capability. Hence for example a predominantly green picture with limited overall movement may be indicative of tennis, whilst a predominantly green picture with regular horizontal panning movement may be indicative of football. Meanwhile a predominantly blue picture with horizontal panning may be indicative of swimming, whilst a predominantly white picture with vertical panning may be indicative of skiing.

Finally, in-picture text may be used in addition to or instead of meta data such as electronic programme guide data. In this case optical character recognition may be used to extract keywords from in-picture text. This text also often appears in certain positions on screen, or under certain circumstances. For example typically channel names appear in the top left corner of the screen and be persistent, meanwhile text identifying what is 'coming up next' will often appear in the bottom left corner of the screen and be temporary. Meanwhile on screen schedule text is typically provided in high contrast against a plain background to assist with user readability.

ii. Broadcast Descriptor Data Corresponding to the Content

Broadcast descriptor data corresponding to the content typically comprises electronic programme guide or EPG data. Typically this data may comprise the current broadcast channel name, a content classification, a genre, a content title, and/or a content summary such as a synopsis.

Similarly, broadcast descriptor data corresponding to the content may comprise subtitle data. One or more keywords may then be extracted from one or more of these sources to provide characteristic features of the delivered AV content.

Keywords from the name of the broadcast channel from which the content is being delivered either live or from a recording recording may have the potential to develop a clear correlation with particular settings. Examples include channel names comprising the word 'sport', 'news', 'movies', 'music' and the like.

Keywords from the content classification similarly may have the potential to develop a clear correlation with particular settings examples include 'film', 'documentary', 'concert', 'soap opera', 'show' and the like as well as other classifying features, such as the content duration (for example respective durations of 120 minutes and 30 minutes are likely to help in discriminate whether or not the content is a movie). Similarly one or more age ratings may have a strong correlation with one or more settings.

Keywords from the content summary (or from one or more content summaries, if there is a short summary and a long summary) may provide useful terms.

Examples may include 'nature', 'investigate', 'match', 'comedy', and 'space', perhaps respectively indicative of a nature documentary, a crime drama, a sports event, a panel show or stand-up routine, and a sci-fi show Furthermore where a plurality of keywords are identified within the content summary, the scope for accurate discrimination between settings is improved, due to a number of different weights that contribute to the assessment of the relationship between the delivered AV content and the settings.

Hence 'tennis' & 'match', 'comedy' & 'panelists', or 'nature' & 'wildlife' may each serve to refine the nature of the show and potentially better clarify which setting or settings have the strongest correlation with this delivered content.

It will be appreciated that in addition to dictionary words, names, such as a place names or people's names, may be included in a content summary (or in the case of people's names, may equivalently be provided as a separate data set that is normally used in parallel with content summary data).

There is often a strong correlation between certain people and the content type they appear in, whether it is drama, action, sports, nature documentaries, soap operas or any other type of content, and so the use of names as characteristic features may be considered. Optionally names may be limited to the first M listed names (for example M=1, 2, 3 or 4), unless those names are alphabetical, in which case either no names may be selected, or only names that are already stored characteristic features. Similarly, where a content summary prefixes a name with 'starring' or similar, such a name may be preferentially used. Such optional approaches may limit the proliferation of names. Again, optionally names that fail a probation may then be deleted from the stored characteristic features.

Like the names of people, content titles are often a mixture of dictionary words and names. One or more keywords (words and/or names) may be taken from such titles, or the title as a whole (optionally without link words such as 'the' or 'at' may be used as a keyword string. Again, optionally titles that fail a probation may then be deleted from the stored characteristic features.

Optionally, titles, title keywords or title keyword strings for popular content may be pre-stored as characteristic features, and further optionally may have associative weights at least to pre-set settings also pre-stored, so that settings are boot-strapped for many popular content items.

Optionally a user can then accept or reject these settings and thereby update this default model.

Keywords from subtitle data may in principle be similarly used as characteristic features. However subtitles have some additional issues to consider. Firstly, there are likely to be many more words, both in terms of total number and variability, in the subtitles on an AV content than in the other descriptive metadata (channel name, classification, title, and/or summary) discussed herein. Secondly, these may be received or accessed during viewing of the content itself.

Consequently, to identify salient terms from subtitle data, optionally a word histogram may be compiled and used to identify high frequency words that, in general language use have a lower comparative frequency. For example the word 'leopard' or the name 'Serengeti' may have a higher frequency in a nature programme than in normal usage. As such these may be identified as salient. Similarly repeated names of characters in the content may have a comparatively high salience.

These terms may subsequently be used as characteristic features for future AV content that uses the terms within the other descriptive metadata (for example a nature programme about leopards), or optionally may be used as characterising features during the currently delivered AV content to confirm or update the setting selection, for example adopting or suggesting a new setting selection during an advert break, or when the content is paused.

This latter approach may also be used during the currently delivered AV content for other features derived directly from the content, such as the dominant colour of the content; in a typical football match, there may be a period of panel discussion before the match, and so different settings may be appropriate as the content progresses.

To this end, a remote control or other interface may also include a button or other indication means by which the user can simply instruct the TV/relevant device to (re-)assess and either confirm or update the setting selection, so that for example when a programme transitions from a panel discussion to the start of the match, the user can press a button to prompt the TV to confirm or update the setting selection, either automatically, without explicit approval by the user, or by implicit or explicit approval such as for example if the user presses the same button again with a predetermined period of time, then the TV reverts to the previous setting.

Hence more generally, the steps of obtaining one or more characteristic features and determining a cumulative strength of association may optionally be triggered (or also triggered) by an indication received from the user.

iii. Downloaded Descriptor Data Corresponding to the Content.

Typically some descriptor data corresponding to the content, when downloaded from the Internet, may be equivalent to broadcast descriptor data corresponding to the content, as described previously herein, and the same observations and techniques will apply.

One likely difference is that the amount of descriptor data may be larger, and comprise more complete summaries, cast lists, character lists and the like, or more nuanced content classifications and the like.

Using this descriptor data may in a similar manner to the broadcast descriptor data described previously herein may therefore provide a more discriminatory basis for learning an appropriate setting or settings for particular AV content and similar items.

Furthermore, additional types of descriptor data may be available for download via the Internet, such as thumbnails or short clips provided when a user looking for content, or chapter thumbnails provided for navigation within a content item.

Such image data may also be used to derive characteristic features, as described previously, such as information aspect ratio, dominant colour, and/or where clips are provided, image motion and/or sound level.

Finally, will be appreciated that data compatible with the techniques described herein may also be provided.

One example includes real-time data such as a trigger flag to indicate when the TV/relevant device (including potentially a streaming service itself) should re-assess the content to either confirm or update the setting selection; in the sense it may operate in a similar manner to the user initiated instruction to (re-)assess and either confirm or update the setting selection described previously herein, but instead triggered by a flag within the content stream, or a parallel data stream.

Another example includes a specific set of characteristic features for the AV content; features not already stored by the TV/relevant device can then be added. Alternatively or in addition, a set of weights associating stored characteristic features with preset settings may be provided, thereby bootstrapping an association between the programme and a preferred setting. Optionally the preset setting and hence the associative weights be selected by the streaming service, or may be derived from the most popular setting selection of other viewers of the same AV content or similar AV content (based on commonality of characteristic features), and hence would be selected settings data previously associated with the content (via characteristic features) by one or more users.

Finally, another example includes a specific group of settings (e.g. a new custom preset) for the AV content. Again this may be selected by the streaming service, or maybe derived for most popular setting selection of other viewers of the same AV content, optionally on the same model of display or on displays sold by the same manufacturer.

Hence will be appreciated for example that a particular AV content may optionally comprise or have in association with it one or more of a dedicated set of characteristic features (thereby enabling the TV/relevant device to obtain these features without necessarily performing any other analysis, although this may still be done), a dedicated set of weights associating these characteristic features with a preferred setting, and a dedicated custom setting as the target of such association, so as to take advantage of the more general scheme for matching content to settings described herein.

As before, these characteristic features may be subject to a probation scheme, so that they are deleted if not reused, and similarly a dedicated custom setting may be subject to a probation scheme so that it is deleted if not re-used.

It will be appreciated that where references were made to words, whether obtained through optical character recognition from the content itself, or from an electronic programme guide, subtitle data or on-line/downloaded data, such words may be stemmed (e.g. regularised by removing endings, or reverting to a common tense), or classified (e.g. by replacing words within a group of synonyms with a single standard word from within that group). Such techniques may be used to reduce the number of word-based characterising features, and so increase the likelihood of them being used, and hence the likelihood that their weights are updated to model the preferences of the user.

iv. Contextual Data.

Contextual data may correspond to particular AV content, but is not necessarily part of that content or necessarily part of associated metadata for that content.

Examples include the identity of the user watching the content, the source of the content, the time of delivery, ambient brightness, and ambient noise level.

The identity of the user may be obtained for example from a selection of users provided by a user interface, or by voice recognition or facial recognition, or by use of a content access pin known to a specific user. The user ID may then be enabled as a characterising feature with its own set of weights, or may be used to restrict the available settings for automated selection, or may be used to provide a global overlay on existing settings (for example, an elderly user may wish to reduce brightness for all picture settings, and increasing treble for all audio settings, but otherwise still enjoy the benefits of the setting selection techniques described herein). In the case that the user is identified as a child or other specified individual, optionally the user ID may be used to disable some or all of the setting selection techniques.

The source of the content may also be used as a characterising feature; for example a DVD® or Blu-ray® source is likely to be delivering a movie, and so weights between this characterising feature and the preferred setting for movies are likely to develop a positive association.

The time of delivery may similarly be used as a characterising feature. In this case, the time of delivery may refer to a schedule time intended by the broadcaster, or where different (for example due to recording or streaming), the actual time of viewing. It will be appreciated for example that there may be a positive association between content viewed in the evening and a 'cinema mode' setting, rather than a 'vivid' mode. The time may also encompass the day of the week; for example a user may have different preferences for the weekday and weekend.

In a similar manner, the ambient brightness of the environment in which the AV content is being viewed may be used as a characterising feature and again it will be appreciated that there may for example be a positive association between content viewed in low light levels and a 'cinema mode' setting.

Similarly, the ambient noise level of the environment in which the AV content is being viewed may be used as a characterising feature; for example there may be a positive association between content viewed when the ambient noise is above a threshold level, and a 'spoken word' audio setting that increases treble to improve dialogue clarity.

Hence as will be appreciated the characteristic features used by the techniques herein for any delivered AV content may fall into one or more of these classes.

It will be appreciated that different classes of data provide different advantages. For example, picture and audio data, and subtitle and 'realtime' online data may provide the ability to update settings during viewing of content (subject to hysteresis or other limits of frequency of change, or on limiting changes to advert breaks, pauses or scene changes), but may also incur costs in terms of computational and memory overhead.

Meanwhile broadcast and online EPG data may be used in advance of accessing the actual content; for example a recommended setting could be provided based on characteristic features of this when browsing a programme guide and deciding whether to record the content or set a reminder; in this case the TV/relevant device could store the recommended setting with any reminder/recording/season link instruction. Typically a user interface is provided for confirming recording settings, and this could include the option to change the suggested picture setting; if not changed, then the TV/relevant device could use the setting automatically for subsequent playback of the recorded content without further interaction from the user, thereby simplifying the selection process for the user whilst still facilitating training of the weights.

Finally, it will be appreciated that a discerning user may wish to create new custom settings in the course of use of the TV/relevant device, for example saving these as 'Custom 1', 'Custom 2' or the like as selectable setting groups.

However, where the system has developed associative weights between stored characteristic features and existing selectable settings, then a newly created custom setting may not be readily selectable, because the weights created between the new setting and the characteristic features do not have sufficient positive values to create a winning associative link between these stored characteristic features and the new setting.

Accordingly, optionally the TV/relevant device can identify the closest existing setting to the newly created custom setting (for example in terms of sum variation in the settings used), and then duplicate the existing weights between that closest existing setting and the stored characteristic features for the newly created custom setting, optionally with a small random permutation to those values, and/or modify way values relating to the characteristic features of the content being viewed whilst the custom setting was created, and/or initially used.

Alternatively or in addition, optionally the TV/relevant device can offer the new custom setting as a second option for selection by the user for a predetermined period of time, either when any previously existing setting is suggested, or when the closest previously existing setting is suggested, so that the user has the opportunity to select the new custom setting and thereby train the weights between that setting and characteristic features of relevant AV content.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 6:
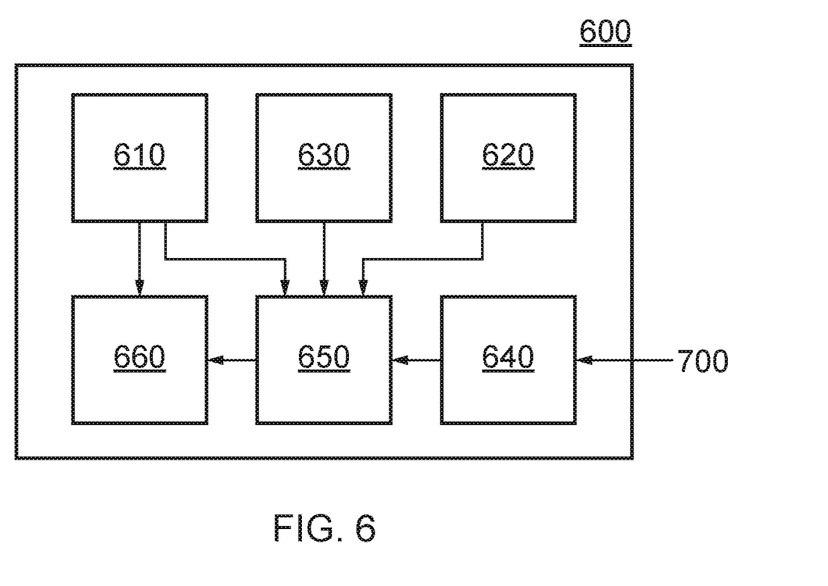
FIG. 6 is a schematic diagram of an AV processor in accordance with embodiments of the present invention.

Hence referring now to FIG. 6 in an embodiment of the present invention an AV processor 600 (for example a TV 10, a set-top box or videogame console 200, an AV amplifier 400, or a streaming source 300) may implement the methods and techniques described herein. The AV processor may comprise a memory (610) adapted to store storing a plurality of settings for presenting AV content; a memory (620) adapted to store a plurality of characteristic features corresponding to AV content; a memory (630) adapted to store a plurality of values defining a strength of association between a respective stored characteristic feature and a respective stored setting; a feature extraction processor (640) adapted to obtain one or more characteristic features from a currently delivered AV content (700); an association processor (650) adapted to determine a cumulative strength of association between respective stored settings and respective stored characteristic features corresponding to the or each characteristic feature obtained from the currently delivered AV content; and a selection processor (660) adapted to select the stored setting having the greatest cumulative strength of association.

It will be appreciated that the plurality of memories described above may all be in a common RAM or similar readable/writable memory such as flash memory. It will also be appreciated that the plurality of processors described above may all be a single processor operating under suitable software instruction for each role, or a mix of dedicated and general processors operating under suitable software instruction to implement one or more roles each.

It will be also apparent to a person skilled in the art that variations in the operation of the above apparatus, corresponding to the various embodiments of the method described and claimed herein, are considered within the scope of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Further, embodiments of the description may be configures as defined in the following numbered clauses:

Clause 1. A method of selecting settings for presenting AV content, comprising the steps of: storing a plurality of settings for presenting AV content;
storing a plurality of characteristic features corresponding to AV content;
storing a plurality of values defining a strength of association between a respective stored characteristic feature and a respective stored setting;
obtaining one or more characteristic features from a currently delivered AV content;
determining a cumulative strength of association between respective stored settings and respective stored characteristic features corresponding to the or each characteristic feature obtained from the currently delivered AV content; and selecting the stored setting having the greatest cumulative strength of association.

Clause 2. The method of clause 1, comprising the steps of: presenting the selected stored setting to the user; and receiving an indication from the user of whether or not to proceed with using the stored setting.

Clause 3. The method of clause 2, comprising the step of if the user indicates to proceed with a selected stored setting, then
strengthening the association between respective stored characteristic features corresponding to the or each characteristic feature obtained from the currently received AV content and the selected stored setting.

Clause 4. The method of clause 2 or clause 3, comprising the steps of
if the user indicates to proceed with a selected stored setting, then
storing one or more characteristic features from the currently received AV content that do not correspond to an existing stored characteristic feature, and
creating a positive association between the or each newly stored characteristic feature and the selected stored setting.

Clause 5. The method of clause 2, comprising the step of if the user indicates not to proceed with a selected stored setting, then
weakening the association between respective stored characteristic features corresponding to the or each characteristic feature obtained from the currently received AV content and the selected stored setting.

Clause 6. The method of clause 2 or clause 5, comprising the steps of
if the user indicates not to proceed with a selected stored setting, then
storing one or more characteristic features from the currently received AV content that do not correspond to an existing stored characteristic feature, and
creating a negative association between the or each newly stored characteristic feature and the selected stored setting.

Clause 7. The method of clause 6, wherein
the total strength of negative association for the or each newly stored characteristic feature is selected to counteract the total positive association of the existing stored characteristic features corresponding to the or each characteristic feature obtained from the currently received AV content.

Clause 8. The method of any one of the preceding clauses, in which:
characteristic features comprise one or more selected from the list consisting of:
i. feature data derived from the content;
ii. broadcast descriptor data corresponding to the content;
iii. downloaded descriptor data corresponding to the content; and
iv. contextual data.

Clause 9. The method of clause 8, in which feature data derived from the content comprises one or more selected from the list consisting of:
i. picture aspect ratio;
ii. dominant colour;
iii. image motion;
iv. sound level;
v. in-picture text;

Clause 10. The method of clause 8, in which broadcast descriptor data corresponding to the content comprises one or more selected from the list consisting of:
i. one or more keywords of the current broadcast channel name;
ii. one or more keywords of a content classification;
iii. one or more keywords of a content title;
iv. one or more keywords of a content summary; and
v. one or more keywords of subtitle data.

Clause 11. The method of clause 8, in which downloaded descriptor data corresponding to the content comprises one or more selected from the list consisting of:
i. one or more keywords of a content classification;
ii. one or more keywords of a content title;
iii. one or more keywords of a content summary;
iv. one or more keywords of subtitle data; and
v. selected settings data previously associated with the content by one or more users Clause 12. The method of clause 8, in which contextual data comprises one or more selected from the list consisting of:
i. the identity of the user watching the content;
ii. the source of the content;
iii. the time of delivery;
iv. ambient brightness; and
v. ambient noise level.

Clause 13. The method of any one of the preceding clauses, in which the steps of obtaining one or more characteristic features and determining a cumulative strength of association, are triggered by an indication received from the user.

Clause 14. A computer readable medium having computer executable instructions adapted to cause a computer system to perform the method of any preceding clause.

Clause 15. An AV processor, comprising:
a memory adapted to store storing a plurality of settings for presenting AV content;
a memory adapted to store a plurality of characteristic features corresponding to AV content;
a memory adapted to store a plurality of values defining a strength of association between a respective stored characteristic feature and a respective stored setting;
a feature extraction processor adapted to obtain one or more characteristic features from a currently delivered AV content;
an association processor adapted to determine a cumulative strength of association between respective stored settings and respective stored characteristic features corresponding to the or each characteristic feature obtained from the currently delivered AV content; and a selection processor adapted to select the stored setting having the greatest cumulative strength of association.

Clause 16. The AV processor of clause 15, adapted to:

present the selected stored setting to the user via a UI; and receive an indication from the user via an input of whether or not to proceed with using the stored setting.

Clause 17. The AV processor of clause 16, adapted so if the user indicates to proceed with a selected stored setting, then the association processor strengthens the association between respective stored characteristic features corresponding to the or each characteristic feature obtained from the currently received AV content and the selected stored setting.

Clause 18. The AV processor of clause 16 or clause 17, adapted so if the user indicates to proceed with a selected stored setting, then the AV processor stores one or more characteristic features from the currently received AV content that do not correspond to an existing stored characteristic feature, and the association processor creates a positive association between the or each newly stored characteristic feature and the selected stored setting.

Clause 19. The AV processor of clause 16, adapted so if the user indicates not to proceed with a selected stored setting, then the association processor weakens the association between respective stored characteristic features corresponding to the or each characteristic feature obtained from the currently received AV content and the selected stored setting.

Clause 20. The AV processor of clause 16 or clause 19, adapted so if the user indicates not to proceed with a selected stored setting, then the AV processor stores one or more characteristic features from the currently received AV content that do not correspond to an existing stored characteristic feature, and the association processor creates a negative association between the or each newly stored characteristic feature and the selected stored setting.

Clause 21. The AV processor of clause 20, wherein the total strength of negative association for the or each newly stored characteristic feature is selected to counteract the total positive association of the existing stored characteristic features corresponding to the or each characteristic feature obtained from the currently received AV content.

Clause 22. The AV processor of any one of the preceding clauses 15-21, in which:

characteristic features comprise one or more selected from the list consisting of:

i. feature data derived from the content;
ii. broadcast descriptor data corresponding to the content;
iii. downloaded descriptor data corresponding to the content; and
iv. contextual data.

Clause 23. The AV processor of clause 22, in which feature data derived from the content comprises one or more selected from the list consisting of:

i. picture aspect ratio;
ii. dominant colour;
iii. image motion;
iv. sound level;
v. in-picture text;

Clause 24. The AV processor of clause 22, in which broadcast descriptor data corresponding to the content comprises one or more selected from the list consisting of:

i. one or more keywords of the current broadcast channel name;
ii. one or more keywords of a content classification;
iii. one or more keywords of a content title;
iv. one or more keywords of a content summary; and
v. one or more keywords of subtitle data.

Clause 25. The AV processor of clause 22, in which downloaded descriptor data corresponding to the content comprises one or more selected from the list consisting of:

i. one or more keywords of a content classification;
ii. one or more keywords of a content title;
iii. one or more keywords of a content summary;
iv. one or more keywords of subtitle data; and
v. selected settings data previously associated with the content by one or more users Clause 26. The AV processor of clause 22, in which contextual data comprises one or more selected from the list consisting of:

i. the identity of the user watching the content;
ii. the source of the content;
iii. the time of delivery;
iv. ambient brightness; and
v. ambient noise level.

Clause 27. The AV processor of any one of the preceding clauses, in which obtaining one or more characteristic features and determining a cumulative strength of association are triggered by an indication received from the user.

The invention claimed is:

1. A method of selecting settings for presenting audio video (AV) content, comprising:

storing a plurality of settings for presenting AV content;

storing a plurality of characteristic features corresponding to the AV content;

storing a plurality of values, each defining a strength of association between a respective stored characteristic feature of the plurality of characteristic features and a respective stored setting of the plurality of settings;

obtaining one or more particular characteristic features from a currently delivered AV content;

determining a cumulative strength of association value between respective stored settings and respective stored characteristic features corresponding to the one or more particular characteristic features obtained from the currently delivered AV content;

selecting the stored setting having the greatest determined cumulative strength of association value among the stored plurality of settings;

presenting, to the user, the selected stored setting having the greatest determined cumulative strength of association value;

receiving an indication from the user of whether or not to proceed with using the selected stored setting having the greatest determined cumulative strength of association value;

when the user indicates to proceed with the presented stored setting having the greatest determined cumulative strength of association value, increasing those values, of the plurality of values, defining the strength of association between the presented stored setting and the respective stored characteristic features corresponding to the one or more particular characteristic features obtained from the currently received AV content; and when the user indicates not to proceed with the presented stored setting having the greatest determined cumulative strength of association value, decreasing those values, of the plurality of values, defining the strength of association between the presented stored setting and the respective stored characteristic features corresponding to the one or more particular characteristic features obtained from the currently received AV content.

2. The method of claim 1, further comprising:
when the user indicates to proceed with a selected stored setting,
storing a characteristic feature of the one or more particular characteristic features from the currently received AV content that do not correspond to an existing stored characteristic feature, and
creating a positive association between the newly stored characteristic feature and the selected stored setting.

3. The method of claim 1, further comprising:
when the user indicates not to proceed with a selected stored setting,
storing a characteristic feature of the one or more particular characteristic features from the currently received AV content that do not correspond to an existing stored characteristic feature, and
creating a negative association between the newly stored characteristic feature and the selected stored setting.

4. The method of claim 3, wherein a total strength of negative association for the newly stored characteristic feature is selected to counteract a total positive association of the existing stored characteristic features corresponding to the one or more particular characteristic features obtained from the currently received AV content.

5. The method of claim 1, wherein the stored characteristic features comprise one or more of feature data derived from the content, broadcast descriptor data corresponding to the content, downloaded descriptor data corresponding to the content, and contextual data.

6. The method of claim 5, wherein the feature data derived from the content comprises one or more of picture aspect ratio, dominant colour, image motion, sound level, and in-picture text.

7. The method of claim 5, wherein the broadcast descriptor data corresponding to the content comprises one or more of one or more keywords of the current broadcast channel name, one or more keywords of a content classification, one or more keywords of a content title, one or more keywords of a content summary, and one or more keywords of subtitle data.

8. The method of claim 5, wherein the downloaded descriptor data corresponding to the content comprises one or more of one or more keywords of a content classification, one or more keywords of a content title, one or more keywords of a content summary, one or more keywords of subtitle data, and selected settings data previously associated with the content by one or more users.

9. The method of claim 5, wherein the contextual data comprises one or more of the identity of the user watching the content, the source of the content, the time of delivery, ambient brightness, and ambient noise level.

10. The method of claim 1, wherein the steps of obtaining the one or more characteristic features and determining the cumulative strength of association are triggered by an indication received from the user.

11. A non-transitory storage medium comprising computer executable instructions configured to cause a computer system to perform the method of claim 1.

12. The method of claim 5, wherein the feature data obtained from the content comprises at least a sound level, and
the selected stored setting is an audio setting.

13. The method of claim 1, wherein the increasing and decreasing steps are performed after a predetermined time, the predetermined time indicating user acceptance of the presented stored setting.

14. The method of claim 1, wherein the increasing and decreasing steps further comprise respectively increasing and decreasing those values defining the strength of association by weight increments that are different for different particular characteristic features from the currently received AV content, according to how common those characteristic features are in all received content.

15. The method of claim 1, wherein the increasing step further comprises increasing those values only up to and not beyond a predetermined value for certain of the particular characteristic features of the currently received AV content.

16. An audio video (AV) processor, comprising:
a first memory storing a plurality of settings for presenting AV content;
a second memory storing a plurality of characteristic features corresponding to the AV content;
a third memory storing a plurality of values, each defining a strength of association between a respective stored characteristic feature of the plurality of characteristic features and a respective stored setting of the plurality of settings; and
circuitry configured to
obtain one or more particular characteristic features from a currently delivered AV content;
determine a cumulative strength of association value between respective stored settings and respective stored characteristic features corresponding to the one or more particular characteristic features obtained from the currently delivered AV content;
select the stored setting having the greatest determined cumulative strength of association value among the stored plurality of settings;
present, to the user, the selected stored setting having the greatest determined cumulative strength of association value;
receive an indication from the user of whether or not to proceed with using the selected stored setting having the greatest determined cumulative strength of association value;
when the user indicates to proceed with the presented stored setting having the greatest determined cumulative strength of association value, increase those values, of the plurality of values, defining the strength of association between the selected stored setting and the respective stored characteristic features corresponding to the one or more particular characteristic features obtained from the currently received AV content; and
when the user indicates not to proceed with the presented stored setting having the greatest determined cumulative strength of association value, decrease those values, of the plurality of values, defining the strength of association between the presented stored setting and the respective stored characteristic features corresponding to the one or more particular characteristic features obtained from the currently received AV content.

17. A television, comprising:
the audio video processor of claim 16,
wherein the stored characteristic features comprise one or more of feature data derived from the content, broadcast descriptor data corresponding to the content, downloaded descriptor data corresponding to the content, and contextual data,
wherein the feature data derived from the content comprises at least a sound level, and
the selected stored setting is an audio setting.

18. The AV processor of claim 16, wherein the circuitry is further configured to perform the increasing and decreasing after a predetermined time, the predetermined time indicating user acceptance of the presented stored setting.

19. The AV processor of claim 16, wherein the circuitry is further configured to respectively increase and decrease those values defining the strength of association by weight increments that are different for different particular characteristic features from the currently received AV content, according to how common those characteristic features are in all received content.

20. The AV processor of claim 16, wherein the circuitry is further configured to increase those values only up to and not beyond a predetermined value for certain of the particular characteristic features of the currently received AV content.

* * * * *